(12) United States Patent
Numata et al.

(10) Patent No.: US 8,308,936 B2
(45) Date of Patent: Nov. 13, 2012

(54) HEAT PUMP-TYPE HOT-WATER SUPPLY DEVICE

(75) Inventors: Mitsuharu Numata, Sakai (JP); Haruo Nakata, Sakai (JP); Syuuji Furui, Sakai (JP); Kaori Yoshida, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 464 days.

(21) Appl. No.: 12/600,980

(22) PCT Filed: Jun. 25, 2008

(86) PCT No.: PCT/JP2008/061528
§ 371 (c)(1),
(2), (4) Date: Nov. 19, 2009

(87) PCT Pub. No.: WO2009/001849
PCT Pub. Date: Dec. 31, 2008

(65) Prior Publication Data
US 2010/0155312 A1 Jun. 24, 2010

(30) Foreign Application Priority Data

Jun. 27, 2007 (JP) ................................ 2007-168511
Jun. 17, 2008 (JP) ................................ 2008-157495

(51) Int. Cl.
*B01J 49/00* (2006.01)
*F25B 7/00* (2006.01)
*F16K 15/00* (2006.01)
(52) U.S. Cl. ............ 210/96.1; 62/197; 62/238.1; 62/79; 137/455; 210/181; 210/205; 356/442

(58) Field of Classification Search .................. None
See application file for complete search history.

(56) References Cited

U.S. PATENT DOCUMENTS

| | | | | |
|---|---|---|---|---|
| 3,692,179 | A * | 9/1972 | Moore | 210/94 |
| 6,895,768 | B2 * | 5/2005 | Sakamoto et al. | 62/196.4 |
| 2005/0247637 | A1 * | 11/2005 | Sher et al. | 210/697 |

FOREIGN PATENT DOCUMENTS

| | | |
|---|---|---|
| JP | 61-153339 A | 7/1986 |
| JP | 2-59089 A | 2/1990 |
| JP | 7-284445 A | 10/1995 |
| JP | 11-125464 A | 5/1999 |
| JP | 2000-179941 A | 6/2000 |

(Continued)

*Primary Examiner* — Krishnan S Menon
*Assistant Examiner* — Dirk Bass
(74) *Attorney, Agent, or Firm* — Birch, Stewart, Kolasch & Birch, LLP

(57) ABSTRACT

A heat pump type hot water supply device is provided with a heat source side heat pump unit having a heat radiating heat exchanger that condenses refrigerant to radiate heat from the refrigerant. The hot water supply device is provided with a water tank that stores water, a water supply pipe that supplies water to the water tank from the outside, a water circulation pipe that is extended in a bypassing manner and circulates the water in the water tank from a bottom section to an upper section, a heat absorbing heat exchanger that is arranged on the water circulation pipe and connected to the heat radiating heat exchanger of the heat source side heat pump unit so as to absorb heat, and a hot water supply unit that comprises a hot water supply pipe that supplies warm water in the upper section of the water tank to the outside.

9 Claims, 9 Drawing Sheets

FOREIGN PATENT DOCUMENTS

| | | |
|---|---|---|
| JP | 2000-314557 A | 11/2000 |
| JP | 2001-317817 A | 11/2001 |
| JP | 2002-98414 A | 4/2002 |
| JP | 2002-106963 A | 4/2002 |
| JP | 2003-83607 A | 3/2003 |
| JP | 2004-190924 A | 7/2004 |

* cited by examiner

HEAT PUMP-TYPE HOT-WATER SUPPLY DEVICE

TECHNICAL FIELD

The present invention relates to a heat pump type hot water supply device that heats water in a water tank by a heat pump unit and supplies the heated water from the water tank.

BACKGROUND ART

An eco-hot water supply device has been provided as an example of a heat pump type hot water supply device (see Patent Document 1 and Patent Document 2).

As shown in FIG. 8, in this type of hot water supply device, a heat pump unit A on the side of a heat source includes a compressor 1, a heat radiating heat exchanger (condenser) 2, an expansion valve 3, and an air heat exchanger (evaporator) 4. The compressor 1 compresses refrigerant to obtain refrigerant of high temperature and high pressure. The heat radiating heat exchanger 2 condenses the refrigerant of high temperature and high pressure that is compressed by the compressor 1 to release heat from the refrigerant. The expansion valve 3 depressurizes the high-pressure refrigerant that is condensed by the heat radiating heat exchanger 2. The air heat exchanger 4 evaporates the refrigerant that is depressurized by the expansion valve 3 to absorb heat from air that is supplied via a fan 5.

A hot water supply unit B includes a water tank (hot water supply tank) 7, a water supply pipe 8, a water circulation pipe 9, and a heat absorbing heat exchanger (water side heat exchanger) 10. The water tank 7 stores water for supplying hot water. The water supply pipe 8 supplies water to a bottom section in the water tank 7. The water circulation pipe 9 extends from the bottom section to an upper section of the water tank 7 in a bypassing manner, and circulates the water in the water tank 7 from the bottom section to the upper section by a water pump 11. The heat absorbing heat exchanger 10 is arranged on the water circulation pipe 9 and connected to the heat radiating heat exchanger (refrigerant side heat exchanger) 2 of the heat pump unit A on the heat source side so as to absorb heat.

The heat source side heat pump unit A is combined with the hot water supply unit B to heat the water in the water tank 7 by the heat radiating heat exchanger 2 of the heat pump unit A on the heat source side via the heat absorbing heat exchanger 6 on the water circulation pipe 9 on the side of the hot water supply unit B.

In such a heat pump type hot water supply device, a constant amount of water is supplied to the water tank 7 from the water supply pipe 8 and stored in the water tank 7. Then, the water in the water tank 7 is heated up to a predetermined temperature (for example, 90° C.) intermittently by the heat radiating heat exchanger 2 of the heat pump unit A on the heat source side via the heat absorbing heat exchanger 10 provided on the water circulation pipe 9 on the side of the hot water supply unit B, and the heated hot water is stored in the upper section of the water tank 7. The hot water in the water tank 7 is discharged from the hot water supply pipe 12 to be used for a desired use such as for the bath, the kitchen, or the shower.

Therefore, in such a conventional heat pump type hot water supply device, a large amount of water is stored in the water tank 7 and the water in the water tank 7 is heated, and hot water is supplied as useful water (hot water). Therefore, the scale formed in the water tank 7 and the water circulation pipe 9 causes a problem.

Patent Document 1: Japanese Laid-Open Patent Publication No. 2002-106963
Patent Document 2: Japanese Laid-Open Patent Publication No. 2003-83607

DISCLOSURE OF THE INVENTION

In the heat pump type hot water supply device that heats water in a non-circulating manner as described above, since the water in the water tank 7 is heated up to high temperature such as approximately 90° C., scale is easily deposited, and particularly a large amount of scale may be deposited on the outlet side of the water circulation pipe of the heat absorbing heat exchanger 10.

For example, with respect to service water or well water, a large amount of scale of calcium is deposited in regions of high water hardness.

Particularly, well water has high water hardness, and impurity forms nuclei and scale are easily deposited. Accordingly, it is impossible to improve the performance of the water side heat absorbing heat exchanger 10, and the water heat exchanger 6, which is combined with the heat radiating heat exchanger 2, becomes large in size.

To prevent deposition of scale, for example: (1) the calcium hardness may be lowered; (2) good water of which the condition does not cause deposition of scale may be used (the super-saturated critical amount of the calcium component dissolution may be increased); (3) crystals of scale components may be refined to be in shape or states such that the scale components do not adhere to wall surfaces of the pipes; and (4) impurity that forms nuclei of crystals may be removed. Further, the hot water supply device may be operated in a temperature that is equal to or lower than the temperature that causes deposition of scale.

However, in the case of operation at a low temperature, a predetermined amount of hot water cannot be stored, and the hot water supply device needs to be operated in daytime as well as and in the nighttime and an extra large hot water tank is required.

Accordingly, it is an objective of the present invention to provide a heat pump type hot water supply device that solves the above problems by the following method. To keep the total amount of scale factor that flows into at least the water side heat absorbing heat exchanger to be equal to or lower than the scale deposition condition, water quality adjusting unit that improves water quality is provided, and a water supply path is branched into two water supply paths including a straight water supply path that supplies water directly to the water tank and a water supply path that supplies water to the water tank via the water quality adjusting unit, and the flow rate of water that flows into the water controlling unit and the flow rate of water that directly flows into the water tank is appropriately controlled according to the actual water to be used quality.

To achieve the above objective, the present invention includes the following effective means.

According to a first aspect of the present invention, in a heat pump type hot water supply device provided with a heat source side heat pump unit having a heat radiating heat exchanger that condenses refrigerant to radiate heat from the refrigerant, and a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside, the heat pump type hot water supply device is characterized in that the water supply pipe is branched into a plurality of water supply paths including a first water supply path and a second water supply path, and the first water supply path supplies water supplied from the outside directly to the water tank and the second water supply path supplies water to the water tank after the water quality of the water from the outside is improved by the water quality adjusting unit so as to hardly generate scale, and one of or both of the water supply paths are selectively used according to the water quality of the supplied water.

If the water supply pipe is branched into a plurality of water supply paths including the first water supply path and the second water supply path, and one of or both of the water supply paths are selectively used according to the water quality of the supplied water, the total amount of scale factor flowing into the water side heat exchanger is improved to be equal to or lower than the scale deposition condition. This effectively improves the performance of the water side heat absorbing heat exchanger and reduces its size.

It is desirable that one of or both of the water supply paths be selectively used according to the water quality of water supplied from the outside by adjusting the flow rate in the first and second water supply paths such that the scale deposition amount in the water supplied from the water tank to the heat absorbing heat exchanger is suppressed to be equal to or lower than a predetermined reference level.

The flow rate of water (divided flow rate) that flows into the water quality adjusting unit and the hot water tank is appropriately controlled according to the water quality of the actual water to be used. This improves the water quality of the total amount of scale factor flowing into the water side heat absorbing heat exchanger to be equal to or lower than the scale deposition condition, and effectively improves the performance of the water side heat absorbing heat exchanger. This reduces the size of the exchanger.

The scale deposition factor is mainly a calcium component. One of or both of the water supply paths are selectively used according to the water quality of the supplied water by adjusting the flow rate of water in the first and second water supply paths so as to suppress the amount of calcium component in the water supplied from the water tank to the heat absorbing heat exchanger to be equal to or less than the reference level.

This also improves the quality of water of the total amount of scale factor flowing into the water side heat absorbing heat exchanger to be equal to or lower than the scale deposition condition, and effectively improves the performance of the water side heat absorbing heat exchanger. This reduces the size of the exchanger.

The flow rate in each water supply path is adjusted, using hot water supply temperature as a parameter. The flow rate in the second water supply path is greater when the hot water supply temperature is high than when the hot water supply temperature is low.

The deposition amount of scale components such as calcium is greater when the temperature of heated hot water is high than when the temperature is low. In other words, the deposition of scale components changes depending on the hot water supply temperature.

The divided flow rate in each of the first and second water supply paths is adjusted, using the hot water supply temperature as a parameter, such that the flow rate of water flowing in the second water supply path via the water quality adjusting unit is greater when the hot water supply temperature high than when the hot supply temperature is low.

Accordingly, even if the hot water supply temperature is high, the deposition of scale components is minimized.

A second aspect of the present invention provides a heat pump type hot water supply device provided with a heat source side heat pump unit having a heat radiating heat exchanger that condenses refrigerant to radiate heat from the refrigerant, and a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside. In the heat pump type hot water supply device, the water supply pipe is branched into a plurality of water supply paths including a first water supply path and a second water supply path, and the first water supply path supplies water supplied from the outside directly to the water tank and the second water supply path supplies water to the water tank after the water quality of the water from the outside is improved by the water quality adjusting unit so as to hardly generate scale, and one of or both of the water supply paths are selectively used according to the water quality of the supplied water, and the hardness of water to be used is previously measured and the flow rate of water in the second water supply path is adjusted such that the hardness of water supplied to the water tank is maximum allowable hardness or less. The maximum allowable hardness is determined in accordance with a currently set hot water supply temperature of water supplied from the heat absorbing heat exchanger.

If the hardness of water to be used is previously measured and the flow rate in the second water supply path that adjusts the water quality via the water quality adjusting unit is adjusted such that the hardness of the water supplied to the water tank is the maximum allowable hardness or less that is determined in accordance with the currently set hot water supply temperature of the water from the heat absorbing heat exchanger, the hardness of water supplied to the water tank is reduced to be within an allowable level range that is equal to or less than a predetermined scale deposition amount under the set hot water supply temperature. This reduces an actual scale deposition amount.

It is desirable that the hardness of water to be used be measured by measuring conductivity of the water to be used with conductivity measuring means.

As the hardness of water increases, the conductivity increases. A conductivity measurement sensor is provided at an inlet portion of the water tank to measure the conductivity. Accordingly, the hardness of water supplied to the water tank is easily measured.

A third aspect of the present invention provides a heat pump type hot water supply device provided with a heat source side heat pump unit having a heat radiating heat exchanger that condenses refrigerant to radiate heat from the refrigerant, and a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside. In the heat pump type hot water supply device, the water supply pipe is branched into a plurality of water supply paths including a first water supply path and a second water supply path, and the first water supply path supplies water supplied from the outside directly to the water tank and the second water supply path supplies water to the water tank after the water quality of the water from the outside is improved by the water quality adjusting unit so as to hardly generate scale, and one of or both of the water supply paths are selectively used according to the water quality of the supplied water. The heat pump type hot water supply device is characterized by scale deposition amount monitoring means for monitoring the scale deposition amount at a hot water outlet portion of the heat absorbing heat exchanger, and water flow rate control means that adjusts the flow rate of water in the second water supply path such that the scale deposition amount at the hot water outlet portion of the heat absorbing heat exchanger is a predetermined value or less based on a monitor value obtained by the scale deposition amount monitoring means.

If the flow rate of water in the second water supply path, which adjusts the water quality, via the water quality adjusting unit is adjusted such that the scale deposition amount at the hot water outlet portion of the heat absorbing heat exchanger becomes greater than or equal to a predetermined value, the hardness of water that is supplied to the water tank is adjusted such that the scale deposition amount at the hot water outlet portion of the heat absorbing heat exchanger becomes the predetermined value or less. As a result, the actual scale deposition amount is reduced.

It is desirable that the scale deposition amount measuring means comprise a particle counter.

As the scale amount increases, the particle mast in water increases. Therefore, a particle counter is provided at the hot water outlet portion of the heat absorbing heat exchanger to measure the particle mass. Accordingly, the scale deposition amount can be monitored.

The scale deposition amount measuring means may comprise conductivity measuring means.

The conductivity increases as the hardness of water increases. Therefore, a conductivity measurement sensor is provided at the hot water outlet portion of the heat absorbing heat exchanger to measure change of the conductivity. Accordingly, the hardness of water is easily monitored.

The scale deposition amount monitoring means may comprise optical measuring means that measures the scale deposition amount based on an amount of light that transmits or reflects from water.

As the scale amount increases, the amount of light that transmits water reduces and the amount of light that reflects from water increases. One of the transmission light amount and the reflection light amount is detected by light emitting means and light receiving means, and a detection value is supplied as a voltage signal by using a photodiode as the light receiving means, for example. Accordingly, the scale deposition amount can be monitored based on change of the voltage value.

A fourth aspect of the present invention provides a heat pump type hot water supply device provided with a heat source side heat pump unit having a heat radiating heat exchanger that condenses refrigerant to radiate heat from the refrigerant, and a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside. In the heat pump type hot water supply device, the water supply pipe is branched into a plurality of water supply paths including a first water supply path and a second water supply path, and the first water supply path supplies water supplied from the outside directly to the water tank and the second water supply path supplies water to the water tank after the water quality of the water from outside is improved by the water quality adjusting unit so as to hardly generate scale, and one of or both of the water supply paths are selectively used according to the water quality of the supplied water. The heat pump type hot water supply device is characterized by water flow rate control means that measures pressure loss between a water inlet side and a water outlet side of the heat absorbing heat exchanger and adjusting the flow rate of water in the second water supply path such that the pressure loss is not increased to a predetermined value or greater.

If the flow rate of water in the second water supply path is adjusted based on the pressure loss between the water inlet side and the outlet side of the heat absorbing heat exchanger, the hardness of water that is supplied to the water tank is reduced to be within an allowable level range that is equal to or less than a predetermined scale deposition amount under the set hot water supply temperature. This reduces the actual scale deposition amount.

It is desirable that the water quality adjusting unit comprise a water softening unit that lowers the hardness of water.

The higher the hardness of water as in the case of well water, the more likely that scale components such as calcium are generated. In case of water of high hardness, impurity therein forms nuclei and the calcium component is crystallized to promote the growth of scale.

Therefore, in adjusting the water quality by the water quality adjusting unit, it is important to soften water of high hardness, and it is effective to use a water softening unit that softens water as the water quality adjusting unit.

It is desirable that the water quality adjusting unit comprise a hydrogen ion concentration improving unit that increases the acidity of water. The scale components such as calcium are more likely to be generated in water of high hardness such as well water. In case of water of high hardness, impurity therein forms nuclei and the calcium component is crystallized. This promotes growth of scale. Scale components are difficult to be dissolved in water if alkaline of water is high. Therefore, scale components are more likely to be deposited.

Therefore, in adjusting the water quality by the water quality adjusting unit, it is important that the hydrogen ion concentration of water of high alkaline is changed to acidify the water. It is effective to use the hydrogen ion concentration improving unit that increases the acidity of water as the water quality adjusting unit.

It is desirable that the water quality adjusting unit comprise a crystal refining unit that refines crystals of the calcium component. Scale components such as calcium are more likely to be generated in water of high hardness such as well water. In water of high hardness, impurity therein forms nuclei to crystallize the calcium component. This promotes growth of scale.

Therefore, in adjusting the water quality by the water quality adjusting unit, it is important that the crystals be refined so that the water flows in the heat absorbing heat exchanger smoothly. It is effective to use a refining unit that refines the crystals of the scale as the water quality adjusting unit.

It is desirable that the water quality adjusting unit comprise a filter unit that captures and removes crystal nuclei of the calcium component. Scale components such as calcium are more likely to be generated in water of high hardness such as well water. In water of high hardness, impurity therein forms nuclei to crystallize the calcium component. This promotes the growth of scale. Therefore, it is effective that the water quality adjustment by the water quality adjusting unit be carried out by the filter unit that captures and removes the crystal nuclei before entering the water tank.

According to the present invention, influences by the scale deposition can be significantly reduced even if the hot water supply temperature is raised. This effectively improves the heat exchange performance of the water side heat exchanger. As a result, the water heat exchanger is reduced in size and cost. The water heating performance of the heat pump type hot water supply device is effectively improved.

BEST MODE FOR CARRYING OUT THE INVENTION

First Embodiment

Figure 1:
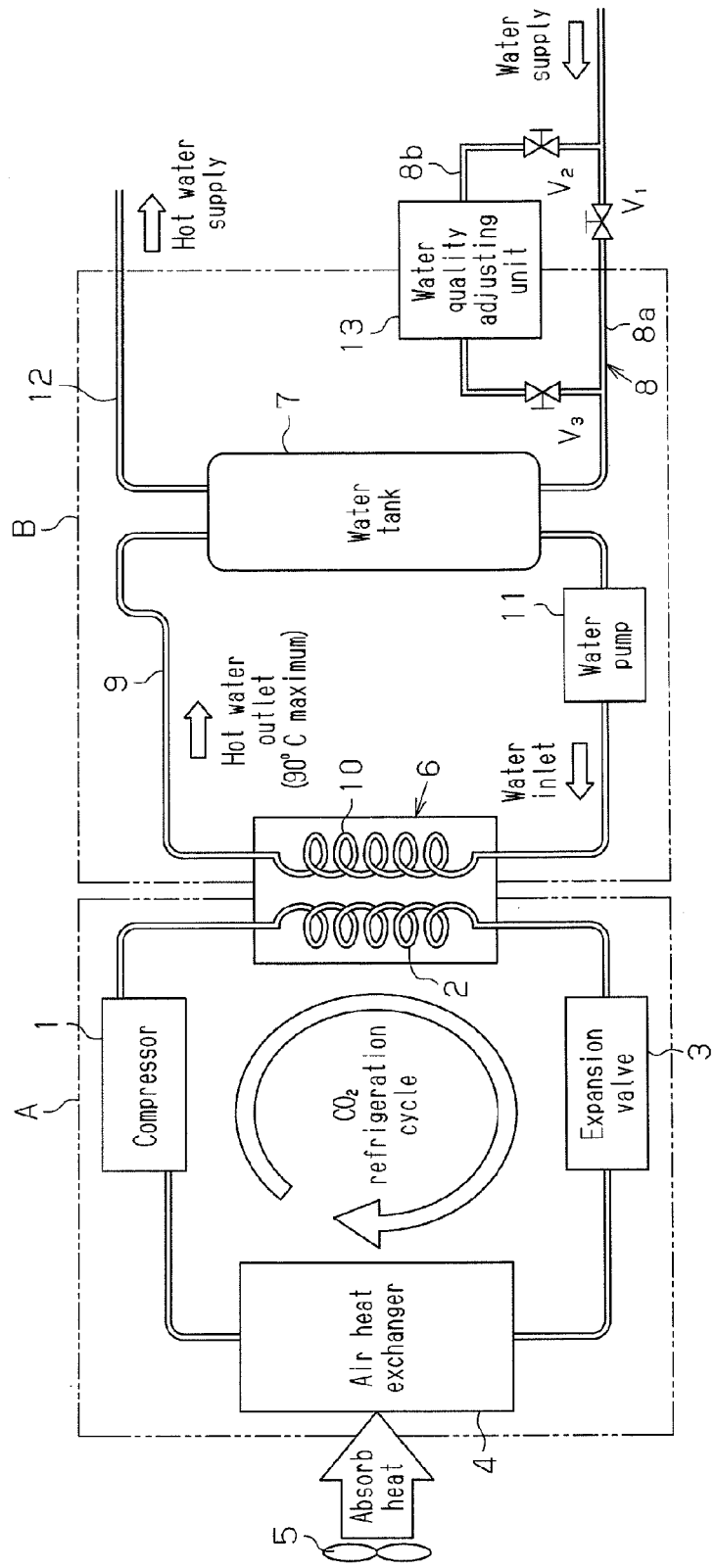
FIG. 1 is a diagram showing the configuration of a heat pump type hot water supply device according to a first embodiment of the present invention.

FIG. 1 shows the configuration of a heat pump type hot water supply device according to a first embodiment of the present invention.

The hot water supply device has a heat source side heat pump unit A and a hot water supply unit B as shown in FIG. 1. The heat source side heat pump unit A includes a compressor 1, a heat radiating heat exchanger (condenser) 2, an expansion valve 3, and an air heat exchanger (evaporator) 4. The compressor 1 compresses refrigerant to obtain refrigerant of high temperature and high pressure. The heat radiating heat exchanger 2 condenses the refrigerant of high temperature and high pressure that is compressed by the compressor 1 to radiate heat from the refrigerant. The expansion valve 3 decompresses the refrigerant that is condensed by the heat radiating heat exchanger 2. The air heat exchanger 4 absorbs heat from air that is supplied via a fan 5 by evaporating the refrigerant that is decompressed by the expansion valve 3.

The hot water supply unit B includes a water tank (hot water supply tank) 7, a water supply pipe 8, a water circulation pipe 9, and a heat absorbing heat exchanger (water side heat exchanger) 10. The water tank 7 has an elongated shape along a vertical direction and stores water, which is supplied as hot water. The water supply pipe 8 supplies water to a bottom section of the water tank 7 from the outside. The water circulation pipe 9 is extended as bypass from the bottom section to the upper section of the water tank 7 and circulates the water in the water tank 7 from the bottom section to the upper section by a water pump 11. The heat absorbing heat exchanger 10 is arranged on the water circulation pipe 9 and connected to the heat radiating heat exchanger (refrigerant side heat exchanger) 2 of the heat source side heat pump unit A so as to absorb heat.

The heat source side heat pump unit A is combined with the hot water supply unit B. Accordingly, the heat radiating heat exchanger 2 of the heat source side heat pump unit A heats the water in the water tank 7 through the heat absorbing heat exchanger 10 on the water circulation pipe 9 of the hot water unit B.

In other words, in the hot water supply device, a predetermined amount of water is supplied to the water tank 7 via the water supply pipe 8 and stored therein. Then, the water in the water tank 7 is heated intermittently up to a desired temperature by the heat radiating heat exchanger 2 of the heat source side heat pump unit A through the heat absorbing heat exchanger 10, which is arranged on the water circulation pipe 9 of the hot water supply unit B. The hot water stored in the water tank 7 is discharged from the hot water supply pipe 12 to be used for the bath, the kitchen, or the shower.

Therefore, in case of such a heat pump type hot water supply device, a great amount of water is stored in the water tank 7, and the water in the water tank 7 is heated and supplied. This causes a problem of scale, which is generated in the water tank 7 and the water circulation pipe 9.

In case of the heat pump type hot water supply device that heats the water in a non-circulating manner, since the water is heated up to 90° C. for example, the scale is deposited at the water supply pipe outlet side (hot water outlet side) of the heat absorbing heat exchanger 10.

Particularly, well water has high hardness and scale is often deposited by crystallization of a calcium component with impurities as nuclei. As a result, high performances on the water side cannot be achieved in the portion having the scale deposition. This problem is particularly caused in the heat absorbing heat exchanger 10 of the water heat exchanger 6.

To prevent the deposition of scale, the device may be operated at a temperature equal to or lower than the temperature that causes the deposition of scale. However, in this case, the predetermined amount of hot water cannot be stored in the water tank, and the device needs to be operated at day time. Further, an extra large hot water tank is required.

In the configuration of the present invention, to keep the amount of scale factor in the total flow rate of water flowing into at least the water side heat absorbing heat exchanger 10 to be equal to or lower than the scale deposition condition, the water supply pipe 8 is branched into at least two water supply paths including a first water supply path 8a and a second water supply path 8b. The first water supply path 8a supplies water supplied from the outside directly to the water tank 7. The second water supply path 8b supplies water to the water tank 7 after the water quality of the water from the outside is improved by the water quality adjusting unit 13 so as to hardly generated scale. According to the configuration of the present invention, one or both of the water supply paths are appropriately used according to the water quality of the supplied water.

Accordingly, the water supply pipe 8 that supplies water supplied from outer water supply sources such as service water or well water is branched into a plurality of water supply paths including the first water supply path 8a and the second water supply path 8b. The first water supply path 8a supplies the water supplied from the outside directly to the water tank 7. The second water supply path 8b supplies water to the water tank 7 after the water quality of the water supplied from the outside is improved by the water quality adjusting unit 13. One of or both of the water supply paths are appropriately used according to the water quality of the supplied water. This improves the water quality such that the total amount of scale factor flowing into the water side heat absorbing heat exchanger 10 becomes equal to or lower than the scale deposition condition. This reduces the deposition amount of scale and improves the performance of the water side heat absorbing heat exchanger 10. This allows size of the exchanger to be reduced.

In this case, one of or both of the water supply paths 8a, 8b are selectively used according to the water quality of water supplied from the outside by providing electromagnetic flow control valves $V_1, V_2, V_3$ that adjust the opening degree of the valves to electrically adjust the flow rate of water in each water supply path. In other words, these valves absolutely or relatively adjust the flow rate of water in the first and second water supply paths 8a, 8b such that the total scale deposition factor in the water supplied from the water tank 7 to the heat absorbing heat exchanger 10 is reduced to be equal to or lower than a predetermined reference level. The valve $V_1$ controls the flow rate of water in the first water supply path 8a and the valves $V_2, V_3$ adjust the flow rate of water in the second water supply path 8b.

According to the water quality of the actual water to be used, each flow rate of water (divided flow rate) that flows into the water quality adjusting unit 13 and the water tank 7 is appropriately controlled. This improves the total amount of scale factor flowing into the heat absorbing heat exchanger 10 to be equal to or lower than the scale deposition condition and suppresses the scale deposition amount at the outlet side of the pipe to effectively improve the performances of the water side heat absorbing heat exchanger 10. This reduces the size of the exchanger.

In most water including well water and service water, the scale deposition factor is mainly a calcium component. One of or both of the water supply paths 8a, 8b are selectively used according to the water quality of the supplied water by adjusting the flow rate of water in the first and second water supply paths 8a, 8b so as to suppress the amount of calcium component in the water supplied from the water tank 7 to the heat absorbing heat exchanger 10 to be equal to or less than the predetermined reference level.

In this case, the divided flow rate in the first and second water supply paths 8a, 8b is adjusted using hot water supply temperature (hot water supply temperature of water from the heat absorbing heat exchanger 10) as a parameter. The flow rate of water in the second water supply path 8b via the water quality adjusting unit 13 is greater when the hot water supply temperature is high than when the hot supply temperature is low.

Figure 9:
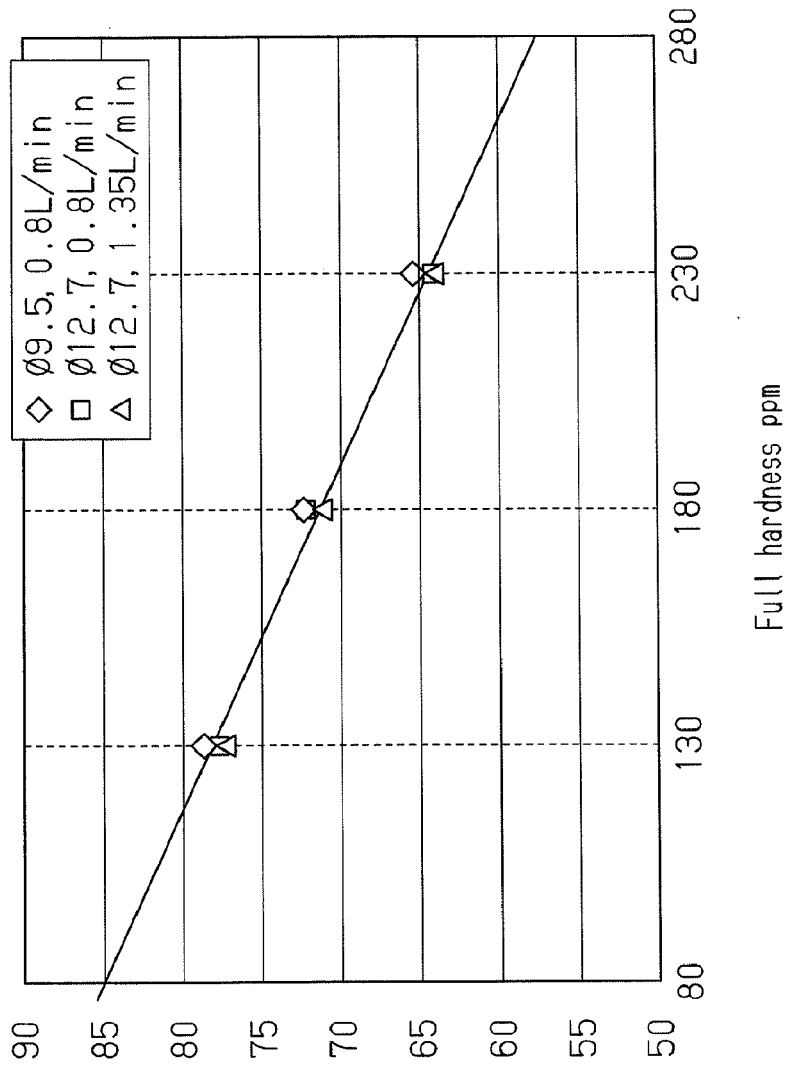
FIG. 9 is a graph showing relationship between hardness of water (full hardness) and water supply temperature in the heat pump type hot water supply device.

The deposition amount of scale components such as calcium is greater when the temperature of heated hot water is high than when the temperature is low (see the graph in FIG. 9). In other words, the deposition of scale components changes according to the hot water supply temperature. The divided water flow rate in the first and second water supply paths 8a, 8b is adjusted using the hot water supply temperature as a parameter, such that the flow rate of water flowing in the second water supply path 8b via the water quality adjusting unit 13 is greater when the hot water supply temperature is high than when the hot water supply temperature is low. Accordingly, even if the hot water supply temperature is high and the scale is easily deposited, the deposition of scale components is minimized.

The water quality adjusting unit 13 in the above configuration includes, for example, a water softening unit that lowers hardness of water. Scale components such as calcium are more likely to be generated in water of high hardness such as well water. In case of water of high hardness, impurity therein forms nuclei and the calcium component is crystallized to promote the growth of scale. Therefore, in adjusting the water quality by the water quality adjusting unit 13, it is important to soften water of high hardness, and it is effective to use a water softening unit that softens water as the water quality adjusting unit 13.

According to the above configuration, the water quality control is explained in following four regions, for example.
(1) Region where standard service water is used,
(2) Region where water hardness is relatively high,
(3) Region where the calcium hardness is at the level of 150, and
(4) Region where the calcium hardness is at the level of 250.

(1) Region where Standard Service Water is Used (General Service Water)

Since the heating temperature is low in summer, both of $V_2$ and $V_3$ of the water quality adjusting unit 13 are off so that no water is supplied (bypassed) to the water quality adjusting unit 13. Only when hot water needs to be stored in winter, a predetermined amount of water is supplied (bypassed) to the water quality adjusting unit 13 according to the temperature.

(2) Region where Water Hardness is Relatively High

A part of water is supplied (bypassed) to the water quality adjusting unit 13 in summer when the heating temperature is low. Water of a predetermined amount or greater is supplied (bypassed) to the water quality adjusting unit 13 in winter so that the hardness of water satisfies the scale deposition condition. Alternatively, the hot water supply temperature is lowered (for example, from 85° C. to 80° C.) to reduce the bypassed amount of water.

(3) Region where the Calcium Hardness is at the Level of 150

When the hot water supply temperature is low (for example, less than 70° C.), no water is bypassed to the water quality adjusting unit 13. However, when the hot water supply temperature is high (for example, 70° C. or higher), part of water is bypassed to the water quality adjusting unit 13. Accordingly, the hardness of water is adjusted to be approximately at the level of 50, for example. The water softening unit removes most of the calcium in water (close to zero). However, when the hardness of water is approximately at the level of 50 to 100, the water is in a supersaturated state and the deposition of scale is not caused. Therefore, water is fully bypassed to the water quality adjusting unit 13, an excessive amount of scale components is removed, and this shortens life of the water softening unit.

(4) Region where the Calcium Hardness is at the Level of 250

When the hot water supply temperature is low (for example, less than 70° C.), part of water is bypassed to the water quality adjusting unit 13 such that the hardness of water is adjusted to be approximately at the level of 150. On the other hand, when the hot water supply temperature is high (for example, 70° C. or higher), part of water is bypassed to the water quality adjusting unit 13 such that the hardness of water is adjusted to be approximately at the level of 50. In a region where the hardness of water is high, the hot water supply temperature is lowered a little (for example, from 85° C. to 80° C.) so as to further reduce the bypassed amount of water.

First Modification

As the water quality adjusting unit 13 in the above configuration, a hydrogen ion concentration improving unit may be used for the water softening unit. The hydrogen ion concentration improving unit increases the acidity of water. Scale components such as calcium are more likely to be generated in water of high hardness such as well water. In case of water of high hardness, impurity therein forms nuclei and the calcium component is crystallized. This promotes growth of scale. Scale component are difficult to be dissolved in water if alkaline of water is high. Therefore, scale components are more likely to be deposited.

Therefore, in adjusting the water quality by the water quality adjusting unit 13, it is important that the hydrogen ion concentration (pH) of water of high alkaline is changed to acidify the water and raise the supersaturation limit. It is also effective to use the hydrogen ion concentration improving unit as the water quality adjusting unit 13. The hydrogen ion concentration improving unit increases the acidity of water.

Second Modification

A crystal refining unit that refines crystals of the calcium component may be used as the water quality adjusting unit 13. Scale components such as calcium are more likely to be generated in water of high hardness such as well water. In water of high hardness, impurity therein forms nuclei to crystallize the calcium component. This promotes growth of scale. Therefore, in adjusting the water quality by the water quality adjusting unit 13, it is important that the crystals be refined by electrolysis, for example, such that the water flows in the heat absorbing heat exchanger 10 smoothly. It is effective that the refining unit that refines the crystals of the scale is used as the water quality adjusting unit 13.

Third Modification

A filter unit that captures and removes crystal nuclei of the calcium component may be used as the water quality adjusting unit 13. Scale components such as calcium are more likely to be generated in water of high hardness such as well water. In water of high hardness, impurity therein forms nuclei to crystallize the calcium component. This promotes the growth of scale. Therefore, it is effective that the water quality adjustment by the water quality adjusting unit 13 may be carried out by the filter unit that captures and removes the crystal nuclei before entering the water tank 7.

Fourth Modification

The water quality adjusting unit 13 may be at any location as long as it is arranged at an upstream side of the heat absorbing heat exchanger 10 with respect to the water flowing direction. For example, the water quality adjusting unit 13 is arranged at the inlet side (upstream side) of the water tank 7 as shown in FIG. 1, or may be arranged at a position between the water tank 7 and the heat absorbing heat exchanger 10 that is between the water tank 7 and the water pump 11 or between the water pump 11 and the heat absorbing heat exchanger 10.

Second Embodiment

FIGS. 2 to 5 show the configuration of a heat pump type hot water supply device according to a second embodiment, which is configured based on the configuration of the first embodiment, and a water supply control device of the second embodiment.

According to the results of survey conducted by the inventors, the hardness of well water or service water on the market is inversely proportional to temperature at the start point of the scale deposition as shown by a graph in FIG. 9. The temperature at the start point of the scale deposition is lowered as the hardness increases, and the temperature at the start point of the scale deposition is raised as the hardness decreases.

Therefore, the hardness of water that is used by a user is previously checked and maximum allowable hardness of water that is actually supplied to the water tank 7 is determined according to a reference value that is a set temperature (set hot water supply temperature of hot water supplied from the heat absorbing heat exchanger 10, which temperature is determined according to a season) of hot water having the previously checked hardness. The flow rate of water flowing in the second water supply path 8b via the water quality adjusting unit 13 is changed such that the hardness of water that is actually supplied to the water tank 7 becomes equal to or less than the maximum allowable hardness. Accordingly, the divided flow rates in the first and second water supply paths 8a, 8b is adjusted, and the device is running such that the scale is not deposited.

Figure 2:
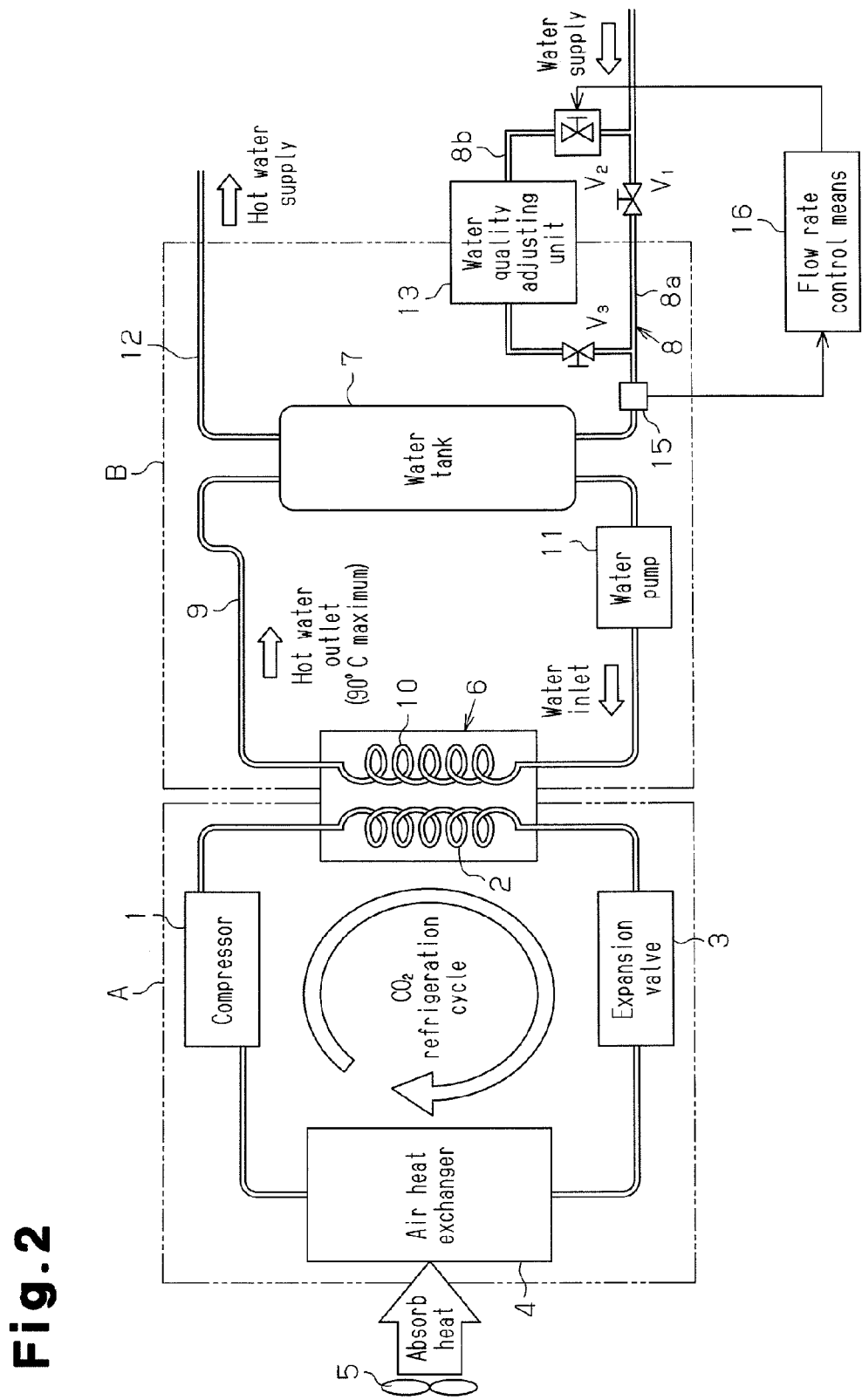
FIG. 2 is a diagram showing the configuration of a heat pump type hot water supply device according to a second embodiment.

In other words, this hot water supply device is configured by combining the heat source side heat pump unit A and the hot water supply unit B, as shown in FIG. 2. The heat source side heat pump unit A includes a compressor 1, a heat radiating heat exchanger (condenser) 2, an expansion valve 3, and an air heat exchanger (evaporator) 4. The compressor 1 compresses refrigerant to obtain refrigerant of high temperature and high pressure. The heat radiating heat exchanger 2 condenses the refrigerant of high temperature and high pressure that is compressed by the compressor 1 to release heat from the refrigerant. The expansion valve 3 depressurizes the high-pressure refrigerant that is condensed by the heat radiating heat exchanger 2. The air heat exchanger 4 evaporates the refrigerant that is depressurized by the expansion valve 3 to absorb heat from air that is supplied via a fan 5.

A hot water supply unit B includes a water tank (hot water supply tank) 7, a water supply pipe 8, a water circulation pipe 9, and a heat absorbing heat exchanger (water side heat exchanger) 10. The water tank 7 is formed in an elongated shape along a vertical direction and stores water for supplying hot water. The water supply pipe 8 supplies water from the outside to a bottom section in the water tank 7. The water circulation pipe 9 extends from the bottom section to an upper section of the water tank 7 as bypass and circulates the water in the water tank 7 from the bottom section to the upper section by a water pump 11. The heat absorbing heat exchanger 10 is arranged on the water circulation pipe 9 and connected to the heat radiating heat exchanger (refrigerant side heat exchanger) 2 of the heat source side heat pump unit A so as to absorb heat.

The water in the water tank 7 is heated by the heat radiating heat exchanger 2 of the heat source side heat pump unit A through the heat absorbing heat exchanger 10 on the water circulation pipe 9 of the hot water supply unit B.

In the heat pump type hot water supply device, a constant amount of water is supplied to the water tank 7 from the water supply pipe 8 and stored in the water tank 7. Then, the water in the water tank 7 is heated up to a predetermined temperature intermittently by the heat radiating heat exchanger 2 of the heat source side heat pump unit A via the heat absorbing heat exchanger 10 provided on the water circulation pipe 9 on the side of the hot water supply unit B, and the heated hot water is stored in the upper section of the water tank 7. The hot water in the water tank 7 is discharged from the hot water supply pipe 12 to be used for a desired use such as for the bath, the kitchen, or the shower.

In the configuration, to keep the amount of scale factor in the total flow rate of water flowing into at least the water side heat absorbing heat exchanger 10 to be equal to or lower than the scale deposition condition, the water supply pipe 8 is branched into at least two water supply paths including a first water supply path 8a and a second water supply path 8b. The first water supply path 8a supplies water supplied from the outside directly to the water tank 7. The second water supply path 8b supplies water to the water tank 7 after the water quality of the water from outside is improved by the water quality adjusting unit 13 so as to hardly generate scale. One of or both of the water supply paths are appropriately used according to the hardness of the supplied water.

The numeral 15 in FIG. 2 represents water hardness measuring means that measures water hardness by measuring conductivity of water supplied to the water tank 7, for example. The water hardness measuring means previously measures the hardness of water supplied to the water tank 7. Actually, as shown by the timing chart in FIG. 5, the water hardness is measured at every predetermined water supply control time th by using a timer. The numeral 16 represents flow rate control means that is provided with a microcomputer. The microcomputer controls the valve opening degree of an inlet side electromagnetic valve $V_2$ of the water quality adjusting unit 13 on the second water supply path 8b. The flow rate control means 16 controls the valve opening degree of an electromagnetic valve $V_2$ such that the hardness of water finally supplied to the water tank 7 becomes equal to or lower than a maximum allowable hardness $H_0$ with respect to the previously measured hardness of water to be used and appropriately controls the flow rate of water supplied to the water quality adjusting unit 13 on the second water supply path 8b. The maximum allowable hardness $H_0$ is determined in accordance with a currently set hot water supply temperature $T_0$ of hot water supplied from the heat absorbing heat exchanger 10.

Figure 3:
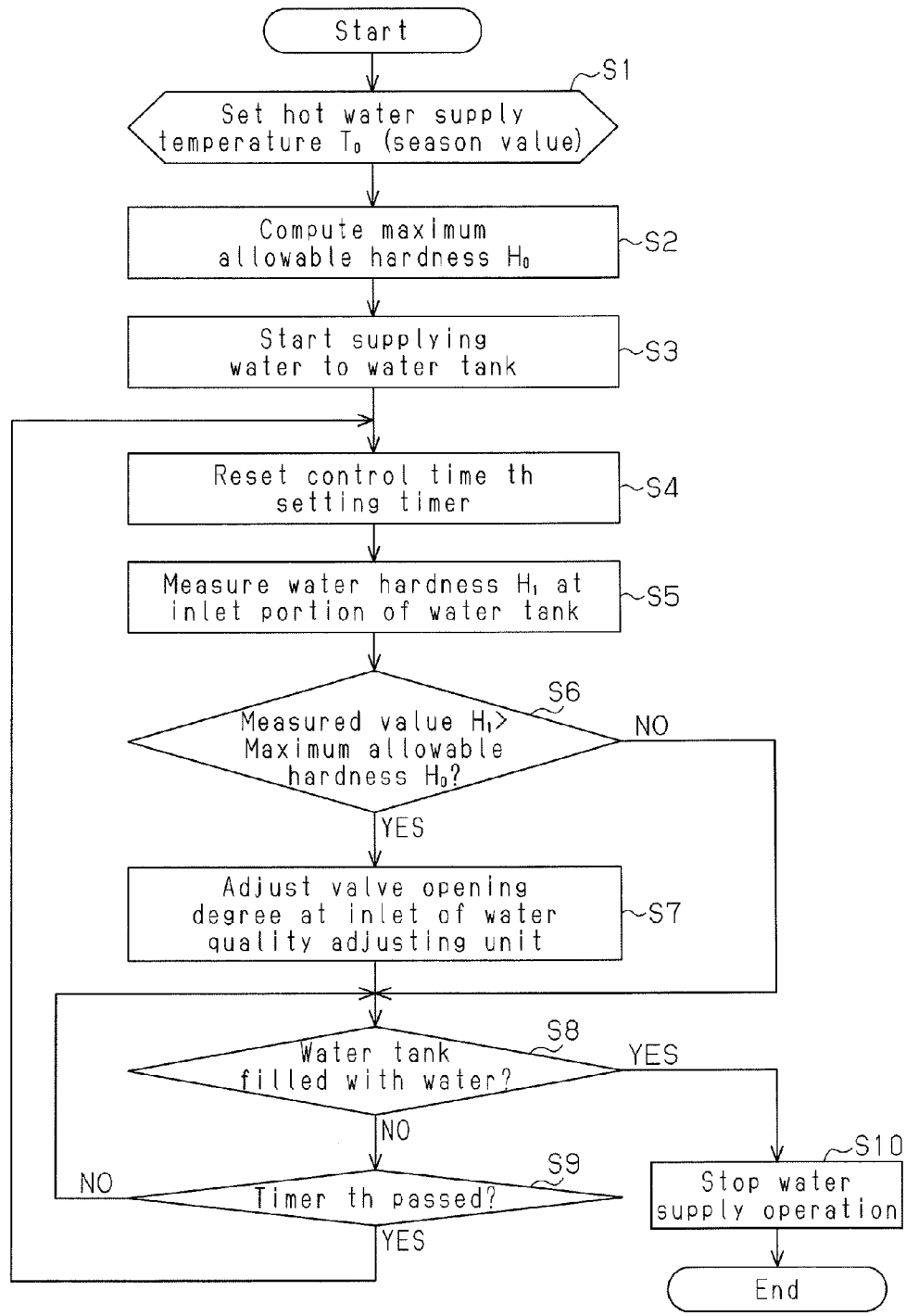
FIG. 3 is a flowchart showing water supply operation control for supplying water to a water tank of the device.

A specific process of the water flow control is shown in the flowchart in FIG. 3. The control is started by supplying power to the flow rate control means 16. In step $S_1$, the hot water supply temperature $T_0$ of hot water supplied from the heat absorbing heat exchanger 10 is set. The hot water supply temperature $T_0$ is determined according to the season such as summer or winter. The hot water supply temperature is set to be lower in the summer and higher in the winter.

Figure 4:
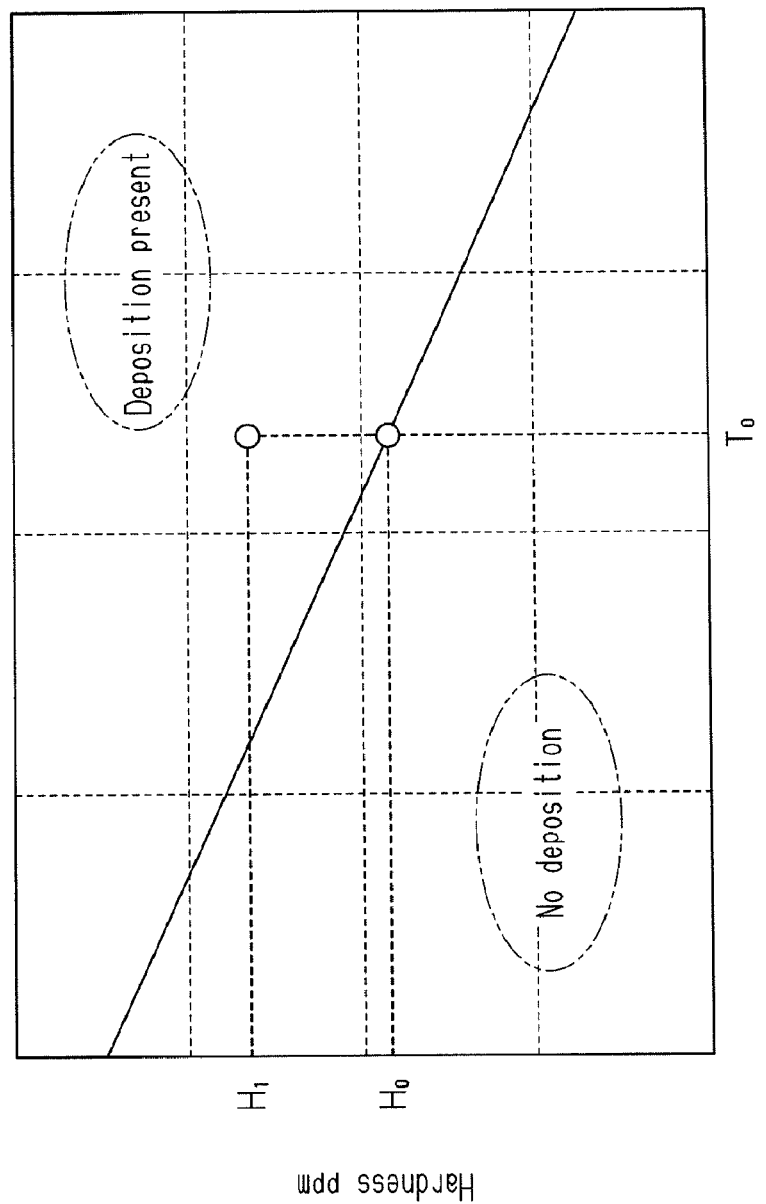
FIG. 4 is a control map used in the water supply operation control shown in FIG. 3.

In step $S_2$, the maximum allowable hardness $H_0$ of water of the hot water supply temperature $T_0$ is read out from a map table shown in FIG. 4 that is produced according to the data shown in FIG. 9. In the map table, the maximum allowable hardness $H_0$ of water is set so as not to cause scale deposition under the hot water supply temperature $T_0$ using the hot water supply temperature $T_0$ as a reading parameter.

The process proceeds to step $S_3$ and a water supply operation to the water tank 7 is started. Synchronously, a timer Th for measuring hardness measurement control time (measurement cycle) th is reset in step $S_4$ to start new counting. At this time, the opening degree of the inlet side electromagnetic valve $V_2$ of the water quality adjusting unit 13 is set to be an initial value (see FIG. 5).

Next, the process proceeds to step $S_5$, and at the starting of the water supply operation, the hardness measuring means 15 measures the hardness $H_1$ of water at the inlet portion of the water tank 7.

In step $S_6$, the measured hardness $H_1$ is compared with the maximum allowable hardness $H_0$ that is obtained in step $S_2$ and it is determined whether an actual measurement value $H_1$ is greater than the maximum allowable hardness $H_0$ that is a reference value.

As a result, if the measurement value $H_1$ is greater than the maximum allowable hardness $H_0$ (YES in step $S_6$), the scale deposition may be caused and the process proceeds to step $S_7$. In step $S_7$, the valve opening degree of the inlet side electromagnetic valve $V_2$ of the water quality adjusting unit 13 is increased to increase the flow rate of water flowing to the water quality adjusting unit 13 and relatively reduce the water flow rate in the first water supply path 8a. Then, the process proceeds to step $S_8$. On the other hand, if the measurement value $H_1$ is smaller (lower) than the maximum allowable hardness $H_0$ (NO in step $S_6$), the process skips step $S_7$ and proceeds to step $S_8$. The water supply operation is continued and it is determined whether the water tank 7 is full in step $S_8$.

Figure 5:
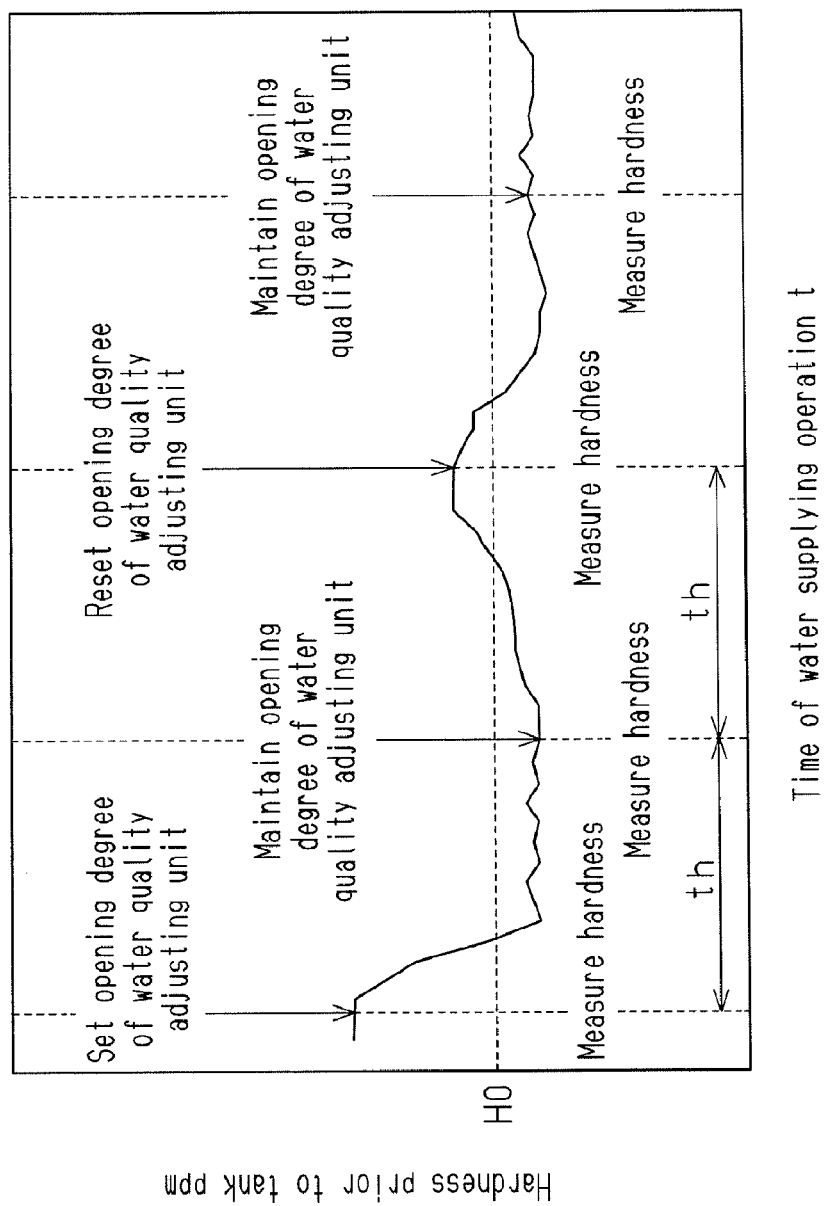
FIG. 5 is a time chart of the water supply operation control shown in FIG. 3.

If the water tank 7 is not full and it is determined NO in step $S_8$, it is determined in step $S_9$ whether the count value of the timer Th reaches unit measurement control time th shown by the timing chart in FIG. 5 and passes the time. If the determination in step $S_9$ is NO, the water supply operation is continued and water is continuously supplied to the water tank 7 until the water tank 7 becomes full while measuring the hardness of water every time the unit measurement control time th has passed. If the water tank 7 is full (YES in step $S_8$), the process finally proceeds to step $S_{10}$ and the water supply operation is stopped, and the control is terminated.

On the other hand, until the water tank 7 is full, the flow rate control means controls the flow rate of water flowing on the side of the water quality adjusting unit 13 such that the actual measured hardness $H_1$ becomes equal to or lower than the maximum allowable hardness $H_0$ ($H_1 \leq H_0$) while measuring the hardness $H_1$ of water supplied to the water tank 7 at every predetermined unit measurement control time th. In other words, steps $S_4$ to $S_9$ are repeated.

Consequently, the hardness of water supplied to the water tank 7 is maintained to be equal to or lower than the maximum allowable hardness $H_0$ that is appropriate with respect to the current hot water supply temperature $T_0$.

Third Embodiment

Figure 6:
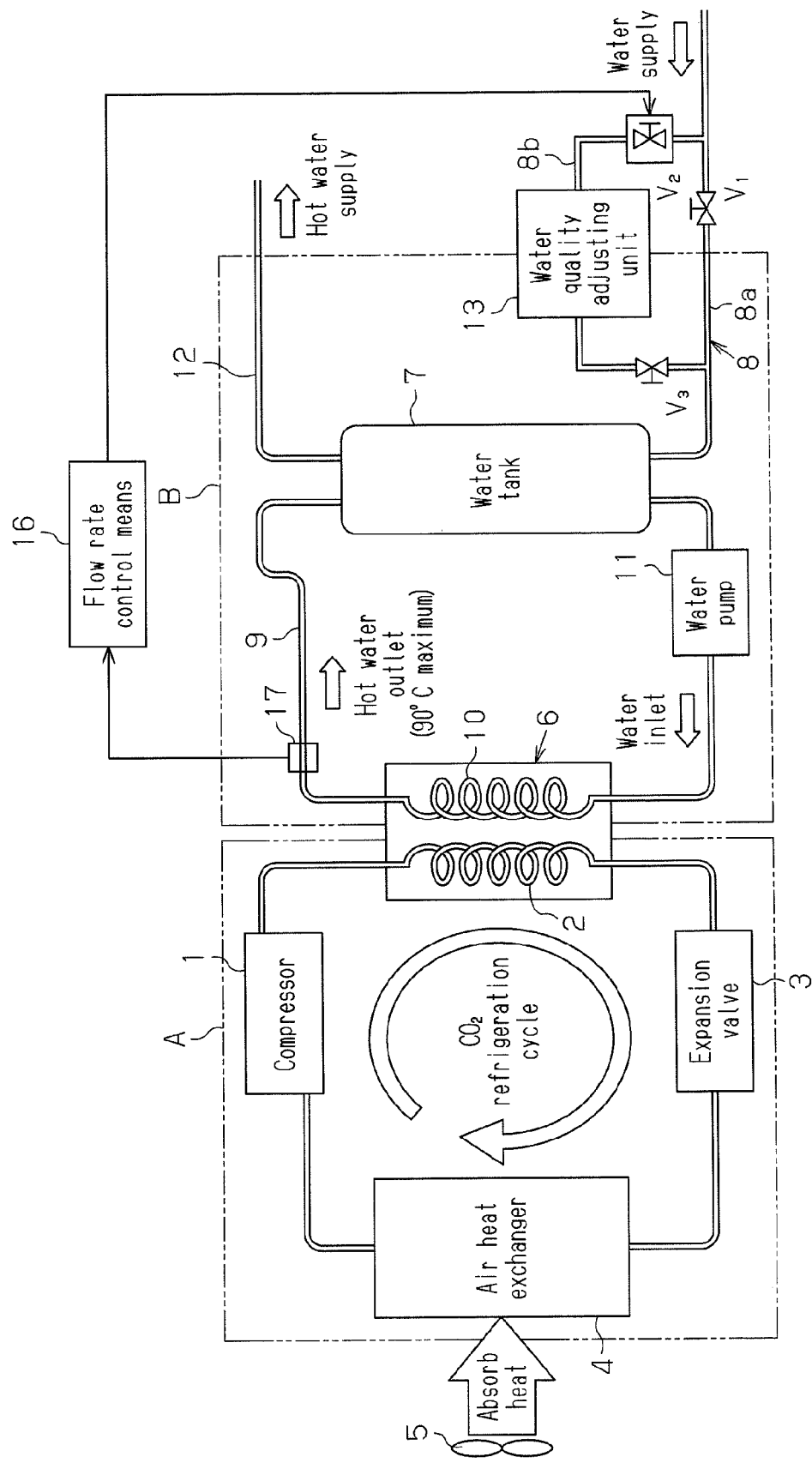
FIG. 6 is a diagram showing the configuration of a heat pump type hot water supply device according to a third embodiment.

FIG. 6 shows the configuration of a heat pump type hot water supply device according to a third embodiment, which is configured based on the configuration of the first embodiment.

In the third embodiment, scale deposition amount monitoring means 17 that monitors a scale deposition amount is arranged at a hot water outlet portion of the heat absorbing heat exchanger 10 of the first embodiment. Flow rate control means 16 is provided in the third embodiment. The flow rate control means 16 controls the opening degree of the electromagnetic valve $V_2$ on the second water supply path 8b such that the scale deposition amount at the hot water outlet portion of the heat absorbing heat exchanger 10 becomes less than or equal to a predetermined value based on the monitor value (detection value) by the scale deposition amount monitoring means 17. Accordingly, the flow rate control means 16 controls the flow rate of water supplied to the water quality adjusting unit 13.

Other configurations are the same as those of the first embodiment.

Accordingly, the scale deposition amount monitoring means 17 monitors the scale deposition amount at the hot water outlet portion of the heat absorbing heat exchanger 10 and adjusts the flow rate of water in the second water supply path 8b, that adjusts the water quality via the water quality adjusting unit 13, such that the scale deposition amount at the hot water outlet portion of the heat absorbing heat exchanger 10 becomes less than or equal to a predetermined value, based on the monitor value (detected value). Then, the hardness of water that is supplied to the water tank 7 is finally adjusted such that the scale deposition amount at the hot water outlet portion of the heat absorbing heat exchanger 10 becomes the predetermined value or less. As a result, the actual scale deposition amount is reduced to be the allowable value or less.

(Specific Examples of Scale Deposition Amount Monitoring Means)

Various types can be applied to the scale deposition amount monitoring means 17. The following examples are appropriate as the scale deposition amount monitoring means 17.

(1) Conductivity Measuring Means

The conductivity increases as the hardness of water increases. Therefore, a conductivity measurement sensor is provided at the hot water outlet portion of the heat absorbing heat exchanger 10 to measure change of the conductivity of hot water. Accordingly, the hardness of water is easily measured and it is determined whether the scale deposition is caused.

(2) Particle Counter

As the scale amount increases, the particle mass in water increases. Therefore, a particle counter is provided at the hot water outlet portion of the heat absorbing heat exchanger 10 to measure the particle mass. Accordingly, the scale deposition amount can be monitored.

(3) Optical Measuring Means for Measuring Scale Deposition Amount Based on Amount of Light that Transmits or Reflects from Water As the scale amount increases, the amount of light that transmits water reduces and the amount of light that reflects from water increases. One of the transmission light amount and the reflection light amount is detected by light emitting means and light receiving means, and a detection value is supplied as a voltage signal by using a photodiode as the light receiving means, for example. Accordingly, the scale deposition amount can be monitored through change of the voltage value.

Fourth Embodiment

Figure 7:
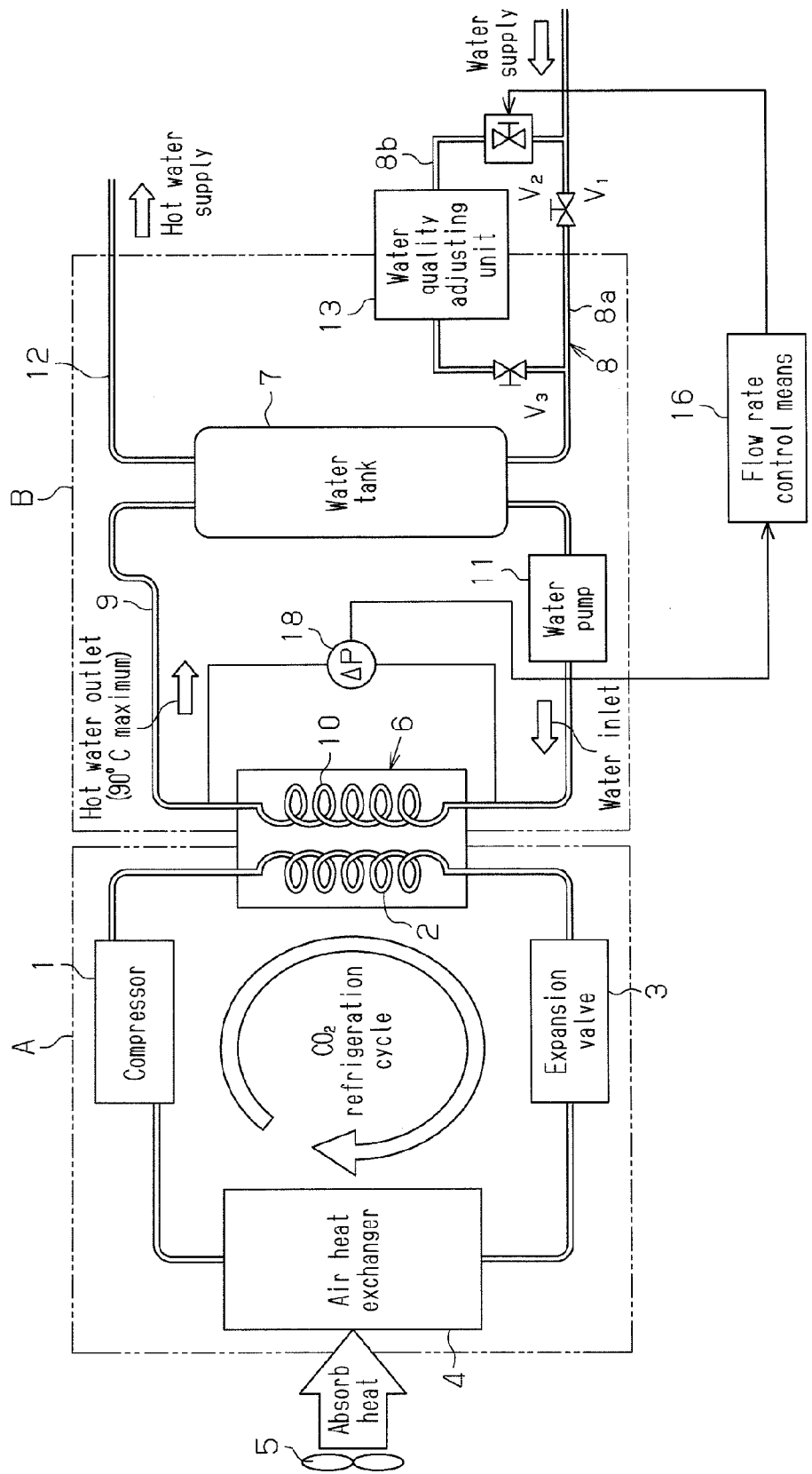
FIG. 7 is a diagram showing the configuration of a heat pump type hot water supply device according to a fourth embodiment.
Figure 8:
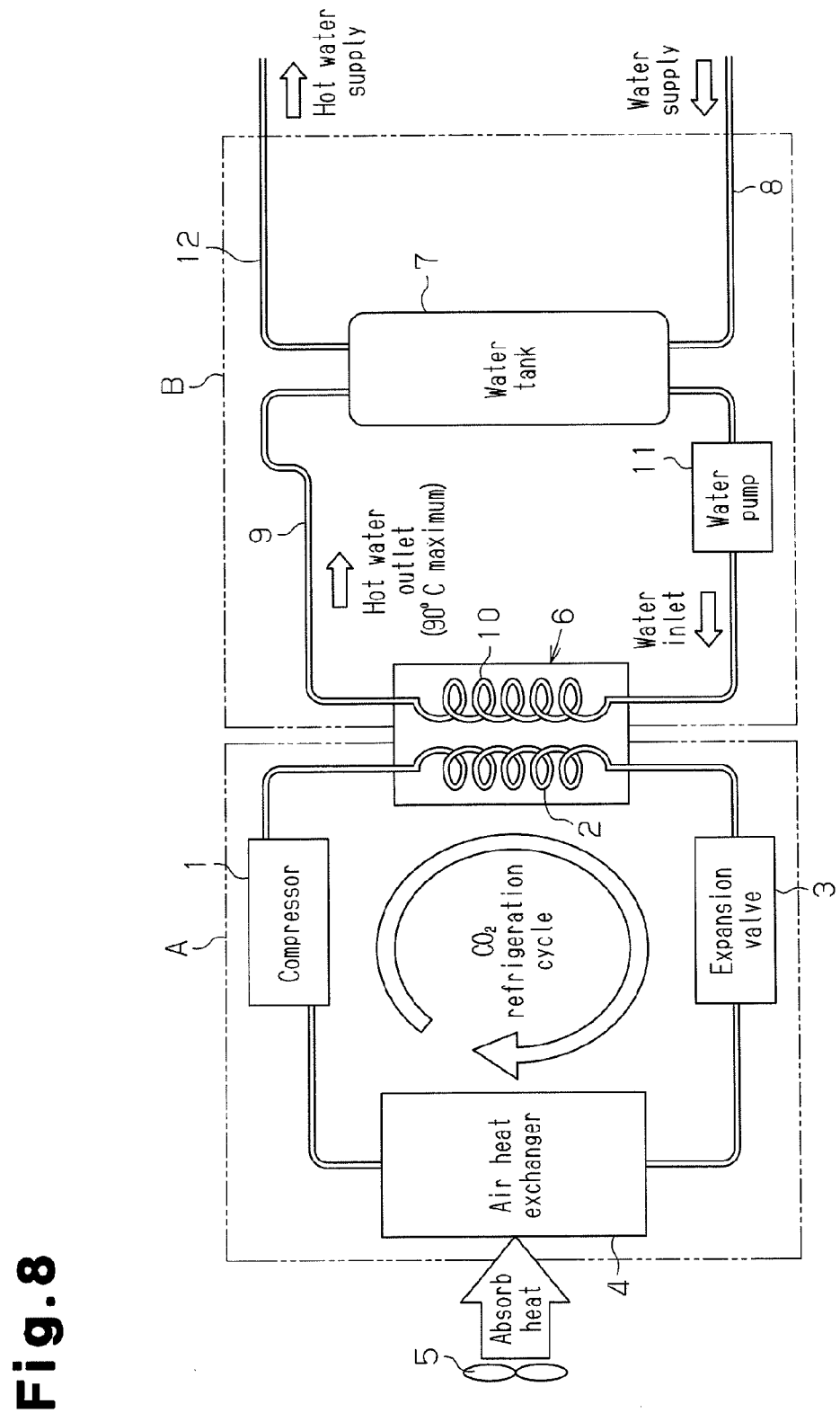
FIG. 8 is a diagram showing the configuration of a conventional heat pump type hot water supply device.

Next, FIG. 7 shows the configuration of a heat pump type hot water supply device according to a fourth embodiment, which is configured based on the configuration of the first embodiment.

In the fourth embodiment, pressure difference detection means 18 is provided to measure pressure loss ΔP that is caused between the water inlet side and the hot water outlet side of the heat absorbing heat exchanger 10 of the first embodiment. The flow rate control means 16 is provided to control the opening degree of the electromagnetic valve $V_2$ of the second water supply path 8b such that the pressure loss ΔP does not increase to a predetermined value or greater. Accordingly, the flow rate control means 16 controls the flow rate of water supplied to the water quality adjusting unit 13. Other configurations are the same as those of the first embodiment.

Accordingly, the pressure loss ΔP between the water inlet side and the hot water outlet side of the heat absorbing heat exchanger 10 is measured to control the flow rate of water in the second water supply path 8b that adjusts the water quality via the water quality adjusting unit 13 such that the pressure loss ΔP does not increase to the predetermined value or greater. Accordingly, the hardness of water that is supplied to the water tank 7 is reduced to be within an allowable level range that is equal to or less than a predetermined scale deposition amount. This reduces the actual scale deposition amount to the allowable value or less.

The invention claimed is:

1. A heat pump type hot water supply device comprising:
 a heat source side heat pump unit having a heat radiating heat exchanger that condenses refrigerant to radiate heat from the refrigerant; and
 a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside,
 wherein the water supply pipe is branched into a plurality of water supply paths including a first water supply path and a second water supply path, wherein the first water supply path supplies water supplied from the outside directly to the water tank and the second water supply path supplies water to the water tank after the water quality of the water from the outside is improved by the water quality adjusting unit so as to hardly generate scale, and one of or both of the water supply paths are selectively used according to the water quality of the supplied water, and
 the heat pump type hot water supply device comprises a scale deposition amount monitor for monitoring the scale deposition amount at a hot water outlet portion of the heat absorbing heat exchanger, and a flow rate controller that adjusts the flow rate of water in the second water supply path such that the scale deposition amount at the hot water outlet portion of the heat absorbing heat exchanger is a predetermined value or less based on a monitor value obtained by the scale deposition amount monitor.

2. The heat pump type hot water supply device according to claim 1, wherein the scale deposition amount monitor comprises a particle counter.

3. The heat pump type hot water supply device according to claim 1, wherein the scale deposition amount monitor comprises a conductivity measuring unit.

4. The heat pump type hot water supply device according to claim 1, wherein the scale deposition amount monitor comprises an optical measuring unit that measures the scale deposition amount based on an amount of light that transmits or reflects from water.

5. A heat pump type hot water supply device comprising:
 a heat source side heat pump unit having a heat radiating heat exchanger that condenses refrigerant to radiate heat from the refrigerant; and a hot water supply unit having a water tank that stores water, a water supply pipe that supplies water to the water tank from the outside, a water circulation pipe that communicates with a bottom section and an upper section of the water tank and circulates the water in the water tank from the bottom section to the upper section in a bypassing manner, a heat absorbing heat exchanger that is arranged on the water circulation pipe and connected to the heat radiating heat exchanger of the heat source side heat pump unit so as to absorb heat, and a hot water supply pipe that supplies hot water in the upper section of the water tank to the outside, wherein the water supply pipe is branched into a plurality of water supply paths including a first water supply path and a second water supply path, wherein the first water supply path supplies water supplied from the outside directly to the water tank and the second water supply path supplies water to the water tank after the water quality of the water from the outside is improved by the water quality adjusting unit so as to hardly generate scale, and one of or both of the water supply paths are selectively used according to the water quality of the supplied water, and the heat pump type hot water supply device comprises
a pressure difference detector that measures pressure loss between a water inlet side and a water outlet side of the heat absorbing heat exchanger, and
a flow rate controller that adjusts the flow rate of water in the second water supply path such that the pressure loss is not increased to a predetermined value or greater.

6. The heat pump type hot water supply device according to claim 1, wherein the water quality adjusting unit comprises a water softening unit that lowers the hardness of water.

7. The heat pump type hot water supply device according to claim 1, wherein the water quality adjusting unit comprises a hydrogen ion concentration improving unit that increases the acidity of water.

8. The heat pump type hot water supply device according to claim 1, wherein the water quality adjusting unit comprises a crystal refining unit that refines crystals of calcium component.

9. The heat pump type hot water supply device according to claim 1, wherein the water quality adjusting unit comprises a filter unit that captures and removes crystal nuclei of calcium component.

* * * * *